United States Patent
Lee et al.

(10) Patent No.: US 10,461,980 B2
(45) Date of Patent: Oct. 29, 2019

(54) METHOD FOR PROCESSING SIGNAL IN WIRELESS COMMUNICATION SYSTEM AND DEVICE THEREFOR

(71) Applicant: LG ELECTRONICS INC., Seoul (KR)

(72) Inventors: Sangrim Lee, Seoul (KR); Hyunsoo Ko, Seoul (KR); Jaehoon Chung, Seoul (KR); Kwangseok Noh, Seoul (KR); Dongkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/563,485

(22) PCT Filed: Oct. 14, 2015

(86) PCT No.: PCT/KR2015/010824
§ 371 (c)(1),
(2) Date: Sep. 29, 2017

(87) PCT Pub. No.: WO2016/159468
PCT Pub. Date: Oct. 6, 2016

(65) Prior Publication Data
US 2018/0091346 A1  Mar. 29, 2018

Related U.S. Application Data

(60) Provisional application No. 62/141,857, filed on Apr. 2, 2015.

(51) Int. Cl.
*H04L 27/26* (2006.01)
(52) U.S. Cl.
CPC ........ *H04L 27/265* (2013.01); *H04L 27/2605* (2013.01); *H04L 27/2628* (2013.01); *H04L 27/2634* (2013.01); *H04L 27/2665* (2013.01)

(58) Field of Classification Search
CPC ..... H04L 2025/03414; H04L 25/03828; H04L 27/265; H04L 27/2605; H04L 27/2607
See application file for complete search history.

(56) References Cited

U.S. PATENT DOCUMENTS

| | | | |
|---|---|---|---|
| 2012/0170650 A1* | 7/2012 | Chong | H04N 19/593 375/240.12 |
| 2015/0341091 A1* | 11/2015 | Park | H04B 7/0456 375/267 |

FOREIGN PATENT DOCUMENTS

WO   WO 2015/024994 A1   2/2015

OTHER PUBLICATIONS

Chen et al., "Multiple Access and Waveforms for 5G: IDMA and Universal Filtered Multi-Carrier," IEEE, 2014, 6 pages.
(Continued)

*Primary Examiner* — Sophia Vlahos
(74) *Attorney, Agent, or Firm* — Birch, Stewart, Kolasch & Birch, LLP

(57) ABSTRACT

A method for a receiving side processing a signal in a wireless communication system according to the present invention may comprise the steps of: receiving, from a transmitting side, information for the length, in a band where the receiving side is allocated, of a band pass filter to be applied to a transmission signal of the transmitting side and the length of the greatest band pass filter applied to a time interval identical to the transmission signal; and on the basis of the information for the length of a band pass filter to be applied to a transmission signal of the transmitting side and the length of the greatest band pass filter applied to a time interval identical to the transmission signal, setting an N Fast Fourier Transform (FFT) window starting point for detecting the transmission signal.

6 Claims, 8 Drawing Sheets

(56) References Cited

OTHER PUBLICATIONS

Schaich et al., "Waveform contenders for 5G—OFDM vs. FBMC vs. UFMC," ISCCSP, 2014, pp. 457-460 (Totals pp. 5).
Vakilian et al., "Universal-Filtered Multi-Carrier Technique for Wireless Systems Beyond LTE," Globecom 2013 Workshop—Broadband Wireless Access, IEEE, 2013, pp. 223-338 (Total pp. 7).
Wang et al., "Universal Filtered Multi-Carrier with Leakage-Based Filter Optimization," VDE VERLAG GMBH, Berlin, Offenbach, Germany, European Wireless 2014, pp. 963-967 (Total pp. 6).

* cited by examiner

FIG. 6
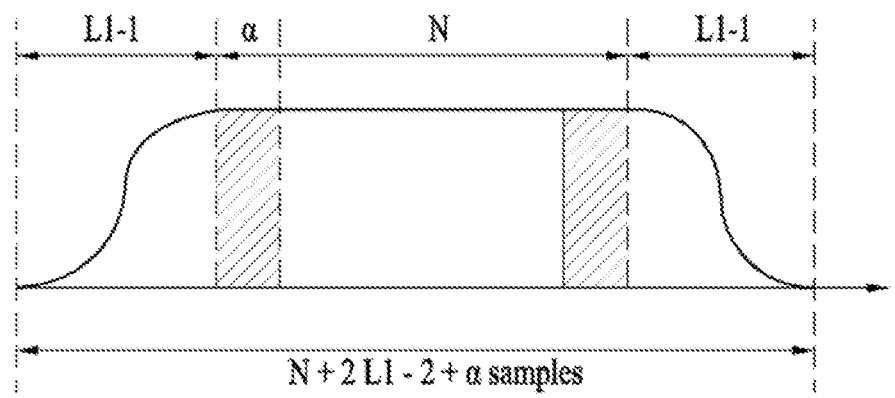
FIG. 7
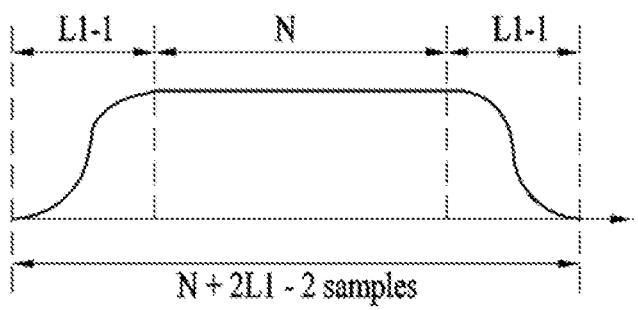
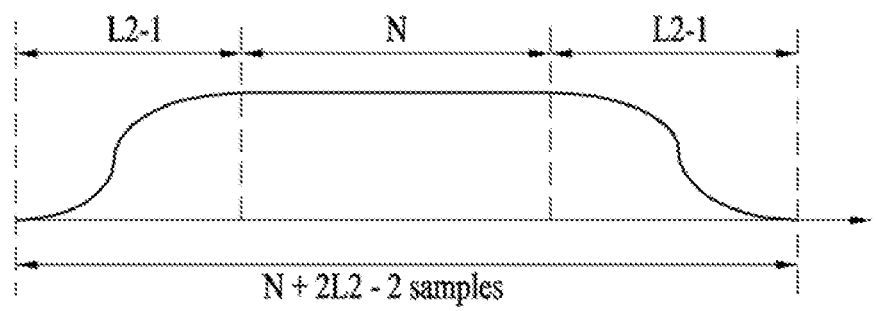

METHOD FOR PROCESSING SIGNAL IN WIRELESS COMMUNICATION SYSTEM AND DEVICE THEREFOR

CROSS REFERENCE TO RELATED APPLICATIONS:

This application is the National Phase of PCT International Application No. PCT/KR2015/010824, filed on Oct. 14, 2015, which claims priority under 35 U.S.C. 119(e) to U.S. Provisional Application No. 62/141,857, filed on Apr. 2, 2015, all of which are hereby expressly incorporated by reference into the present application.

TECHNICAL FIELD

The present invention relates to a wireless communication system, and more particularly, to a method for processing a signal in a wireless communication system and a device therefor.

BACKGROUND ART

A 3GPP LTE (3rd Generation Partnership Project Long Term Evolution) system has been designed in a frame structure having a transmission time interval (TTI) of 1 ms, and its data request latency time for a video application is 10 ms. However, the future 5G technology requires data transmission of lower latency due to the advent of a new application such as real-time control and tactile internet, and it is expected that 5G data request latency will be lowered to reach 1 ms.

However, the frame structure having a TTI of 1 ms according to the related art has a problem in that data request latency of 1 ms cannot be fulfilled. 5G aims to provide data latency reduced as much as about 10 times as compared with the related art. It is required to solve this problem.

DISCLOSURE

Technical Problem

An object of the present invention is to provide a method for processing a signal in a receiving side of a wireless communication system.

Another object of the present invention is to provide a method for processing a signal in a transmitting side of a wireless communication system.

Still another object of the present invention is to provide a receiving side device for processing a signal in a wireless communication system.

Further still another object of the present invention is to provide a transmitting side device for processing a signal in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve one object of the present invention, a method for processing a signal by a receiving side of a wireless communication system comprises receiving, from a transmitting side, information on a length of a band pass filter to be applied to a transmission signal of the transmitting side on assigned band for the receiving side and a length of the greatest band pass filter applied to the same time interval as that of the transmission signal; and setting an N Fast Fourier Transform (FFT) window starting point for detecting the transmission signal based on the information on the length of the band pass filter to be applied to the transmission signal of the transmitting side, and a length of the greatest band pass filter applied to the same time interval as that of the transmission signal. The method may further comprise detecting a signal by processing FFT operation for N samples from the N FFT window starting point. The band to which the length of the greatest band pass filter applied to the same time interval as that of the transmission signal is applied may be different from the band allocated to the receiving side.

The step of setting the N FFT window starting point includes calculating, by the receiving side, an adaptive CP length (Wi) on the assigned band for the receiving side, by using Equation 1, and setting the N FFT starting point based on the adaptive CP length, $$Wi = Li-1 + 2 \times (L\_max - Li), \quad \text{[Equation 1]}$$

where $Li-1$ is a CP length used by the transmitting side on the assigned band for the receiving side, and L-max is a length of the greatest band pass filter applied to the same time interval as that of the transmission signal.

To achieve another object of the present invention, a method for processing a signal in a transmitting side of a wireless communication system comprises transmitting, to a receiving side, information on a length of a band pass filter to be applied to a transmission signal of the transmitting side on assigned band for the receiving side and a length of the greatest band pass filter applied to the same time interval as that of the transmission signal; and processing IFFT (Inverse Fast Fourier Transform) operation based on the information on the length of the band pass filter to be applied to the transmission signal of the transmitting side on the assigned band for the receiving side. The length of the band pass filter to be applied to the transmission signal at another band adjacent to the assigned band for the receiving side may be set differently from the length of the band pass filter to be applied to the transmission signal of the transmitting side on the assigned band for the receiving side.

To achieve still another object of the present invention, an apparatus of receiving side for processing a signal in a wireless communication system comprises a receiver for receiving, from a transmitting side, information on a length of a band pass filter to be applied to a transmission signal of the transmitting side on assigned band for the receiving side and a length of the greatest band pass filter applied to the same time interval as that of the transmission signal; and a processor for setting an N Fast Fourier Transform (FFT) window starting point for detecting the transmission signal based on the information on the length of the band pass filter to be be applied to the transmission signal of the transmitting side, and a length of the greatest band pass filter applied to the same time interval as that of the transmission signal. The processor may be configured to detect a signal by processing FFT computation for N samples from the N FFT window starting point. The band to which the length of the greatest band pass filter applied to the same time interval as that of the transmission signal is applied may be different from the assigned band for the receiving side.

If the processor sets the N FFT window starting point, the processor may be configured to calculate an adaptive CP length Wi for the band where the receiving side is allocated, by using Equation 1, and set the N FFT starting point based on the adaptive CP length, $$Wi = Li-1 + 2 \times (L\_max - Li),\qquad \text{[Equation 1]}$$

where Li−1 is a CP length used by the transmitting side on the assigned band for the receiving side and L-max is a length of the greatest band pass filter applied to the same time interval as that of the transmission signal.

To achieve further still another object of the present invention, a transmitting side device for processing a signal in a wireless communication system comprises transmitter for transmitting, to a receiving side, information on a length of a band pass filter to be applied to a transmission signal of the transmitting side on assigned band for the receiving side and a length of the greatest band pass filter applied to the same time interval as that of the transmission signal; and a processor for processing IFFT (Inverse Fast Fourier Transform) operation based on the length of the band pass filter to be applied to the transmission signal of the transmitting side on the assigned band for the receiving side. The processor may set that the length of the band pass filter to be applied to the transmission signal at another band adjacent to the assigned band for the receiving side is different from the length of the band pass filter to be applied to the transmission signal of the transmitting side on the assigned band for the receiving side.

Advantageous Effects

Low complexity operation for reducing a size of the legacy FFT may be performed using adaptive CP in accordance with the present invention.

Transmission may be performed by multiplexing using adaptive CP such that interference may not occur even though bandpass filters of different lengths are used between bands.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 6 is a diagram illustrating that additional CP is further set as much as a;

FIG. 7 is an exemplary diagram illustrating a multiplexing scheme of a signal when filters of different lengths are applied to two subbands (subband B1 and subband B2)

BEST MODE FOR CARRYING OUT THE INVENTION

Figure 1:
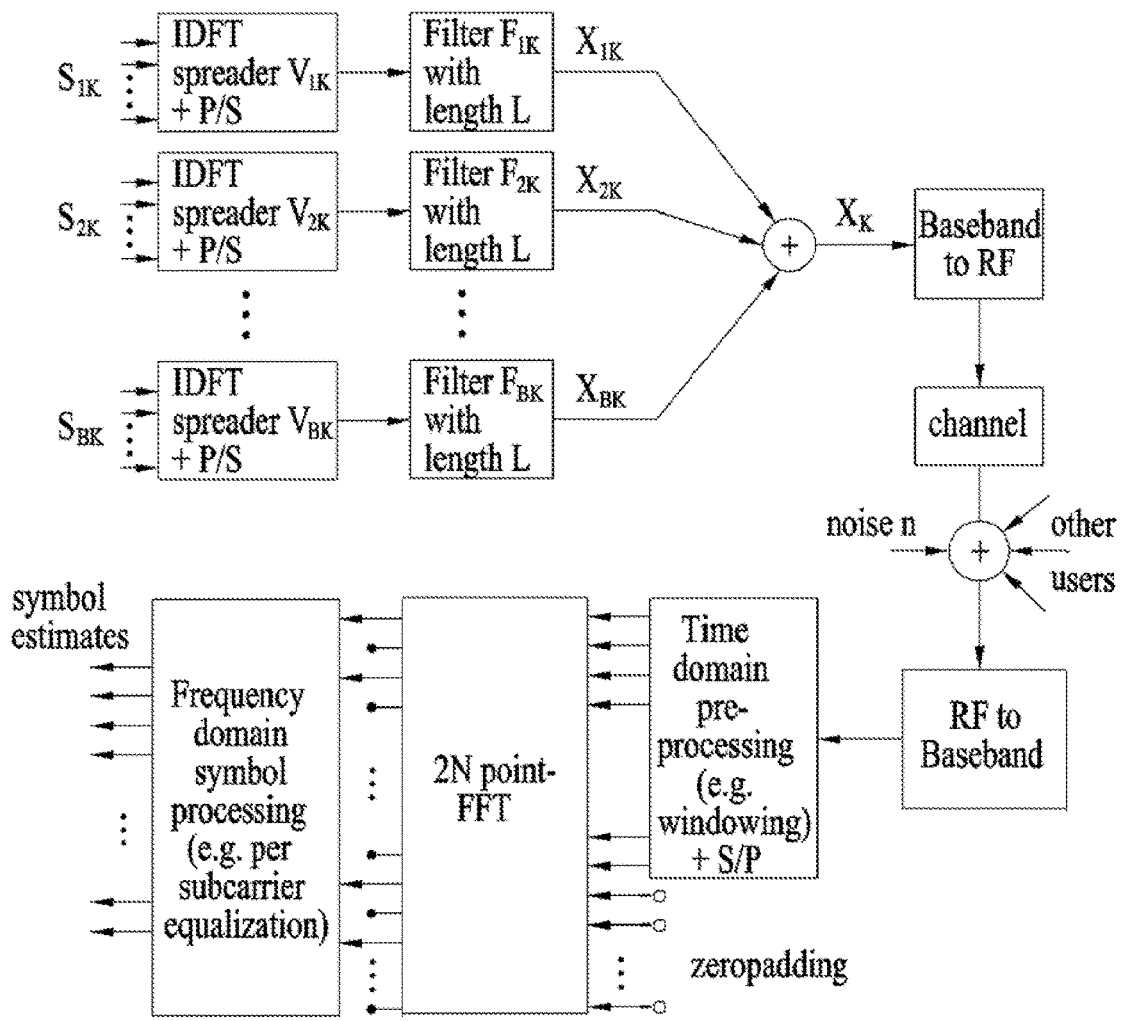
FIG. 1 is a diagram illustrating a transceiver end of an UF-OFDM.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

UF-OFDM (Universal Filtered-OFDM) means a new waveform to which a filter is applied in a unit of a group of subcarriers without using CP unlike the legacy CP-OFDM (Cyclic Prefix based OFDM).

FIG. 1 is a diagram illustrating a transceiver end of UF-OFDM.

FIG. 1 illustrates a transmitter and a receiver of UFMC. As shown in FIG. 1, a filter is applied to the transmitter in a unit of a group of subcarriers unlike the legacy OFDM. In this way, the filter is applied in a unit of sub-band, interference on another adjacent band may be more reduced than the legacy OFDM scheme. This characteristic brings great gain in view of usage of fragmented spectrum in the current status that frequency resources are exhausted, and acts on a base for future technology communication.

Figure 2:
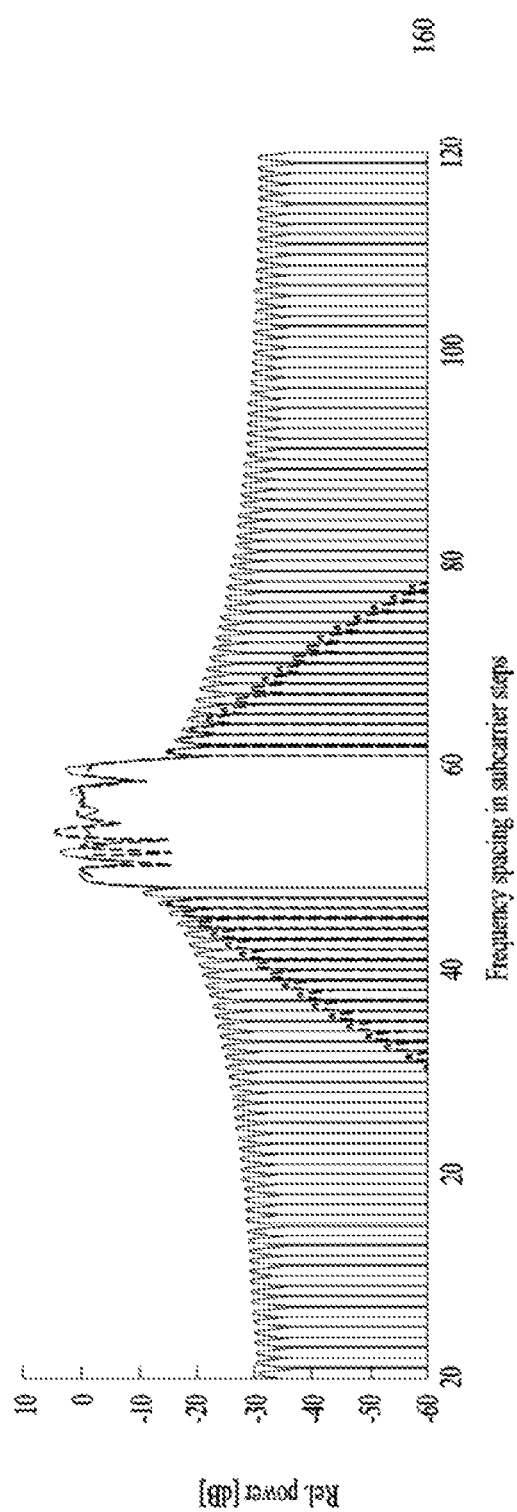
FIG. 2 is a diagram illustrating comparison of power spectrums between the legacy OFDM and UF-OFDM based on a filter in an actual frequency domain.

FIG. 2 is a diagram illustrating comparison of power spectrums between the legacy OFDM and UF-OFDM based on a filter in an actual frequency domain.

As shown in FIG. 2, as the legacy OFDM symbols are radiated on a frequency axis, a power of a signal affecting another band is gradually reduced. On the other hand, in case of UF-OFDM, it is noted that a power of a signal affecting another band is fast reduced. Based on this characteristic, UF-OFDM is regarded as one candidate of a new waveform, and less interferes on an adjacent band. To obtain gain in view of the above out-of-band emission, the UF-OFDM scheme generates overhead in that detection should be performed using a 2N size of FFT (Fast Fourier Transform) size in the legacy OFDM. This is because that a length of an overall symbol becomes long when a filter is applied and as a result, the receiver should perform FFT of 2N size after zero-padding to perfectly detect a transmission signal. Therefore, it is advantageous that leakage of a signal to another band is reduced, whereas a problem occurs in that FFT greater than the legacy CP-OFDM as much as twice should be used. If this receiver serves as a UE, the receiver may act as great overhead. As described above, since the UF-OFDM has a problem of complexity in that 2N FFT should be performed as compared with the legacy CP-OFDM, a method for solving this problem is required.

Figure 3:
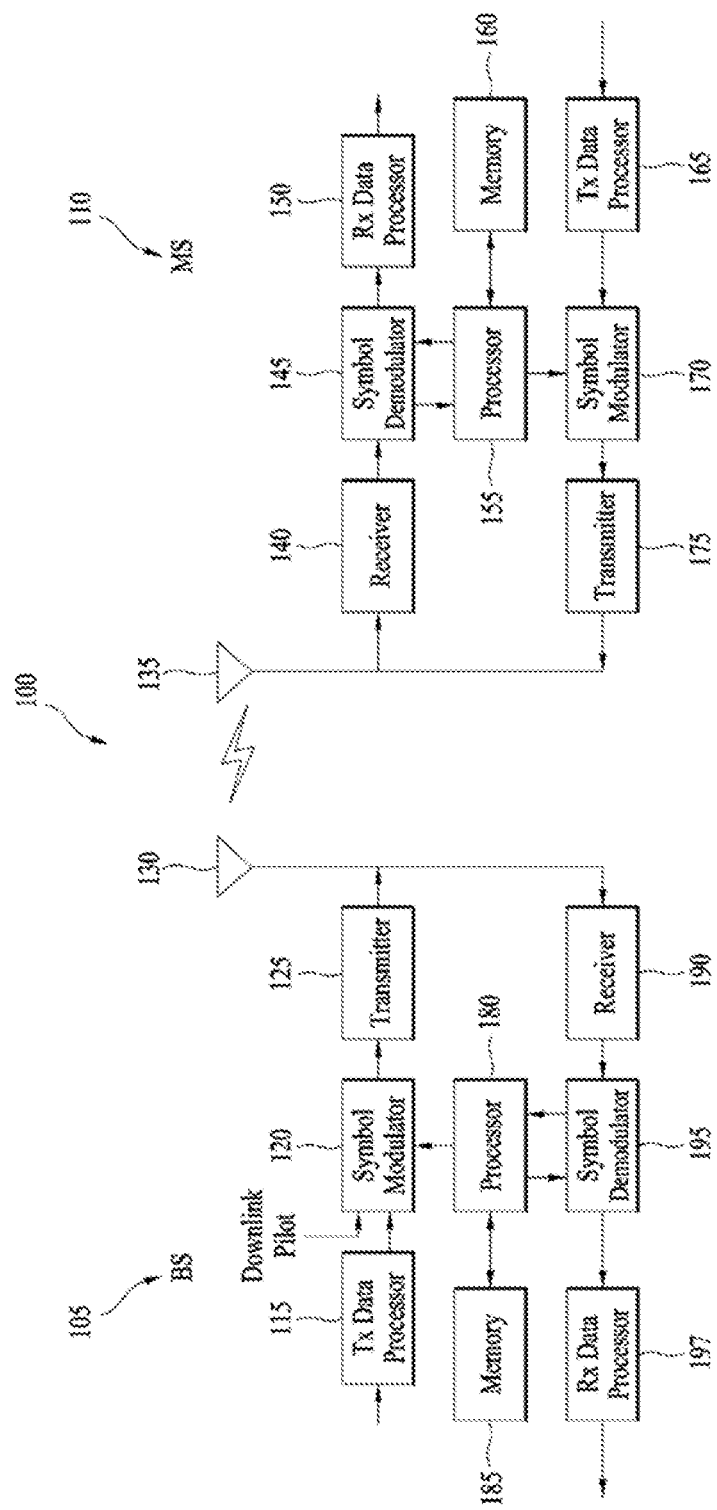
FIG. 3 is a block diagram illustrating a base station (BS) 105 and a user equipment (UE) 110 in a wireless communication system.

FIG. 3 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 3, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention suggests a low complexity reception scheme based on adaptive CP. As described above, in case of the UF-OFDM scheme which uses a band pass filter, FFT of 2N size is required. For a detailed reason, it is assumed that there is a system that can use N subcarriers. It is also assumed that one subband is comprised of M subcarriers (granularity=M subcarriers) and a filter has a length of L. Also, a size of M of one subband is uniform at the same time but M and L may be changed at different timing points. In this case, a length of a time domain signal of one subband in the transmitter becomes N+L−1 by means of linear convolution operation. The legacy CP-OFDM takes FFT using N samples after CP is cancelled, whereas the corresponding signal is detected in such a manner that FFT of 2N closest to N+L−1 is performed and then odd numbered output of 1, 3, 5, . . . is obtained. At this time, zero padding is performed for FFT of 2N as much as N−L+1 as an input. The subband described in the present invention means some of a system bandwidth between the transmitting side and the receiving side, and may be referred to as a band.

Low Complexity Reception Method Through Adaptive CP Usage

In case of the legacy CP-OFDM, a length of CP is fixedly designed to overcome multipath delay. However, in case of the UF-OFDM scheme, a length of a filter is varied depending on a size of a subcarrier set which belongs to one subband. Therefore, a method for adaptively using a size of CP having a length of W will be suggested. First of all, a size of CP for FFT of N size not FFT of 2N size is first computed.

Figure 4:
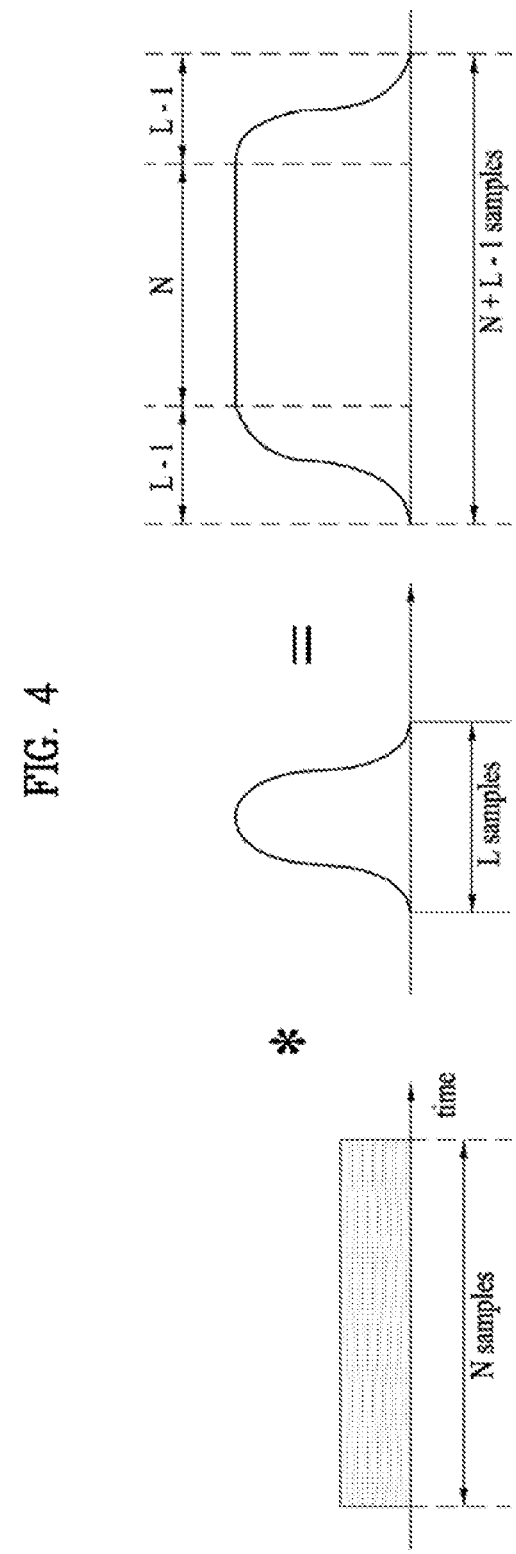
FIG. 4 is a schematic diagram illustrating an example of a time domain transmission signal of the legacy scheme (adaptive CP length W=0)

FIG. 4 is a schematic diagram illustrating an example of a time domain transmission signal of the legacy scheme (adaptive CP length W=0).

In FIG. 4, as a result of convolution operation for a sample of a length N and a filter of a length L, since a period for maintaining orthogonality of a transmission signal among N+L−1 samples exists as much as N−L+1, detection should be performed using 2N FFT not N FFT. At this time, complexity of the receiver may remarkably be increased due to usage of 2N FFT for driving of UF-OFDM as compared with N FFT of the legacy CP-OFDM system. To solve the problem related to increase of complexity of the receiver, a method for obtaining a length of N sample for maintaining orthogonality using N FFT only by adding CP of a proper length is suggested in FIG. 5.

Figure 5:
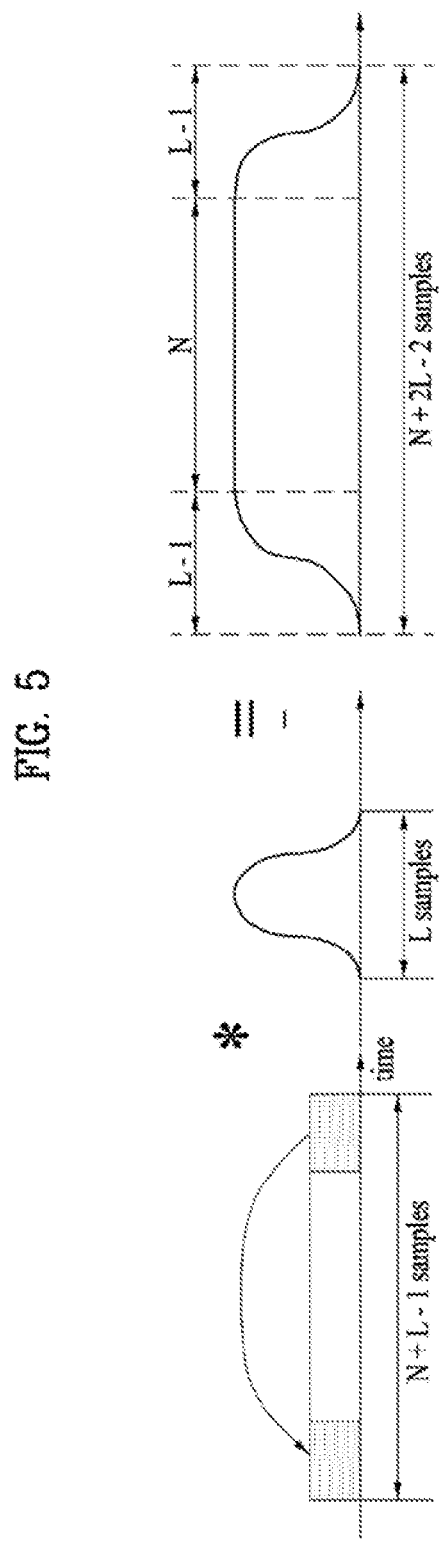
FIG. 5 is a diagram illustrating an example of a transmission signal based on adaptive CP (adaptive CP length W=L−1)

FIG. 5 is a diagram illustrating an example of a transmission signal based on adaptive CP (adaptive CP length W=L−1).

As shown in FIG. 5, N FFT may be performed in such a manner that CP is added as much as L−1 obtained by subtracting 1 from a length corresponding to a length of a filter. In this way, as shown in FIG. 5, the receiving side may detect the original signal if FFT is applied by excluding L−1 of a first signal and taking next N samples.

Next, Table 1 illustrates an adaptive CP application example based on various subband granularities.

TABLE 1

| N_FFT size | Subband Granularity (M) | Applied filter length (L) | Length (W) of adaptive CP |
|---|---|---|---|
| 2048 | 12 | 80 | 79 |
| 2048 | 24 | 40 | 39 |
| 1024 | 12 | 40 | 39 |
| 1024 | 24 | 20 | 19 |

In this case, adaptive CP is used to enable N FFT without being used to prevent multipath delay spread unlike the legacy adaptive CP. Also, a symbol length smaller than that of the legacy CP-OFDM may be obtained depending on design of a fitter and subband granularity.

As described above, a minimum value for N FFT is L−1. However, even in case of a value greater than L−1, N FFT may be performed, and FFT operation may later be performed as much as a sample length of a considering the added length, whereby an exact signal may be detected. FIG. 6 is a diagram illustrating that additional CP is further set as much as a. As shown in FIG. 6, additional CP is further set as much as a, whereby a time synchronization and frequency synchronization algorithm based on CP characteristic used conventionally may be used.

Next, a method for reporting information for reception will be suggested.

Method for Obtaining Filter Information Used by a Transmitting Side or Information Corresponding to the Filter Information in a Receiving Side As described above, the transmitting side may apply various subband sizes and filters corresponding to the various subband sizes depending on a channel status or service condition. Therefore, for exact detection of a transmission signal, the receiving side needs the number of subcarriers belonging to the subband and information on the applied filter. This is intended to allow the receiving side to know an exact position of a starting point of an FFT window to detect the transmission signal. Therefore, two methods are suggested as follows. The first method is that a look-up table, which includes coefficient and length information of an available filter, is shared between the transmitting side and the receiving side and the transmitting side notifies the receiving side of a corresponding filter index only. Information to be included in the look-up table is as listed in Table 2.

TABLE 2

| Filter index | Filter length | Filter coefficient |
|---|---|---|
| 0 | 4 | {4 coefficients} |
| 1 | 8 | {8 coefficients} type 1 |
| 2 | 8 | {8 coefficients} type 2 |
| ... | ... | ... |
| 15 | 128 | {128 coefficients} |

The look-up table of the above Table 2 may include various filers having the same filter length but different coefficients depending on types. The transmitting side may notify the receiving side of the applied filter by using the look-up table to allow the receiving side to detect the transmission signal. For example, it is considered that a table has the number N_filter of filters. First of all, in order that the corresponding table includes all of the number N_filter of filters, allocation equivalent to bits $\lceil \log 2(N_{filter}) \rceil$ to control information is required.

The second method is that a length of the applied filter is separated from the coefficient of the actual filter. The first method is to store coefficients related to all filter types, whereas the second method is that the transmitting side explicitly notifies the receiving side of only a type of the filter and thus the receiving side implicitly knows the coefficient of the actually used filter. For the second method, the transmitting side needs to notify the receiving side of (1) length information of the filter, (2) a type of the filter, (3) side-lobe attenuation information value dB of the filter as follows.

(1) Length information of the filter
Ex) 80, 40, . . .
(2) Type of the filter
Ex) 1: chebshev filter 2: raised cosine filter, . . .
(3) Side-lobe attenuation information value dB of the filter
Ex) 60, 80, . . .

The second method has an advantage in that filter configuration and update may be performed dynamically as compared with the first method. For example, supposing that a type of a filter length is N_length, a filter type is N_type, and a type of the side-lob attenuation information value of the filter is N_atten, to include these three types of information to the control information, bits of a size of $\lceil \log 2(N_{length}) \rceil + \lceil \log 2(N_{type}) \rceil + \lceil \log 2(N_{atten}) \rceil$ will be required.

A method for allowing the transmitting side to notify the receiving side of information (control information according to the first method and control information according to the second method) on the filter used by the transmitting side is as follows. Prior to initial access, the transmitting side may transmit the information on the filter used by the transmitting side by including the information in system information (for example, system information field (SIB)) to the receiving side through a PDSCH (Physical Downlink Shared CHannel), or may transmit the information on the filter used by the transmitting side to the receiving side through a PBCH (Physical Broadcast Channel). Also, considering that the information is changed per K TTI (K is 1 or more), the transmitting side may notify the receiving side of the information on the filter used by the transmitting side through a physical downlink control channel (for example, PDCCH), and the receiving side may perform detection of a transmission signal on the basis of the control information.

Multiplexing Scheme During Application of Filters Having Different Lengths Per Same Time Band (or Subband)

It has been described that a filter length L is equally maintained per frequency band (or subband) at the same time. However, if the filter length is different per frequency band (or subband), a length of each symbol filtered is varied, whereby mutual orthogonality of the symbols is not ensured. Therefore, a new multiplexing scheme is required to transmit a signal by applying filters of different lengths per band (or subband) at the same time. Hereinafter, the multiplexing scheme will be suggested.

For example, it is assumed that filters having different lengths L1 and L2 are applied to two subbands (subband B1 and subband B2). That is, it is assumed that the transmitting side transmits a signal by applying different filter lengths to two subbands. In this case, as shown in FIG. 7, periods (period marked with 'N' at the subband B1 and period marked with 'N' at the subband B2) for ensuring mutual orthogonality are overlapped with each other, whereby it is difficult to perform multiplexing and mutual interference exists. For example, the transmitting side (for example, base station) may allocate a user equipment UE1 to the subband B1 and allocate a user equipment UE2 to the subband B2. If different filter lengths are applied to these two subbands, the transmitting side (for example, base station) needs to notify the receiving side (for example, UE) of the information applied to or used for the corresponding subband through signaling. The receiving side should know the information applied to or used for the corresponding subband to exactly detect a signal transmitted from the transmitting side. The reason why that the respective lengths different from each other are applied to these two subbands is that services provided by the two subbands may be different from each other. For example, if requirement service and real-time service are provided to a specific UE by low latency required by the 5G system or a moving speed of the specific UE is very fast, subband different from that of the legacy LTE UE may be allocated, whereby the filter length may be different from the length of the filter of the subband allocated to the legacy LTE UE.

FIG. 7 is an exemplary diagram illustrating a multiplexing scheme of a signal when filters of different lengths are applied to two subbands (subband B1 and subband B2).

As described above, if the filters of different lengths are applied to two subbands B1 and B2, the following adaptive CP method is required to maintain orthogonality. As an example of the adaptive CP method, supposing that adaptive CP of the ith subband among a plurality of subbands is Wi and a length of the longest filter among the subands is L_max, the transmitting side (for example, base station) may set an adaptive CP length Wi of the ith subband as expressed by the following Equation 1.

Adaptive $CP$ length $Wi$ of the $ith$ subband$=Li-1+2\times(L\_max-Li)$ [Equation 1]

Figure 8:
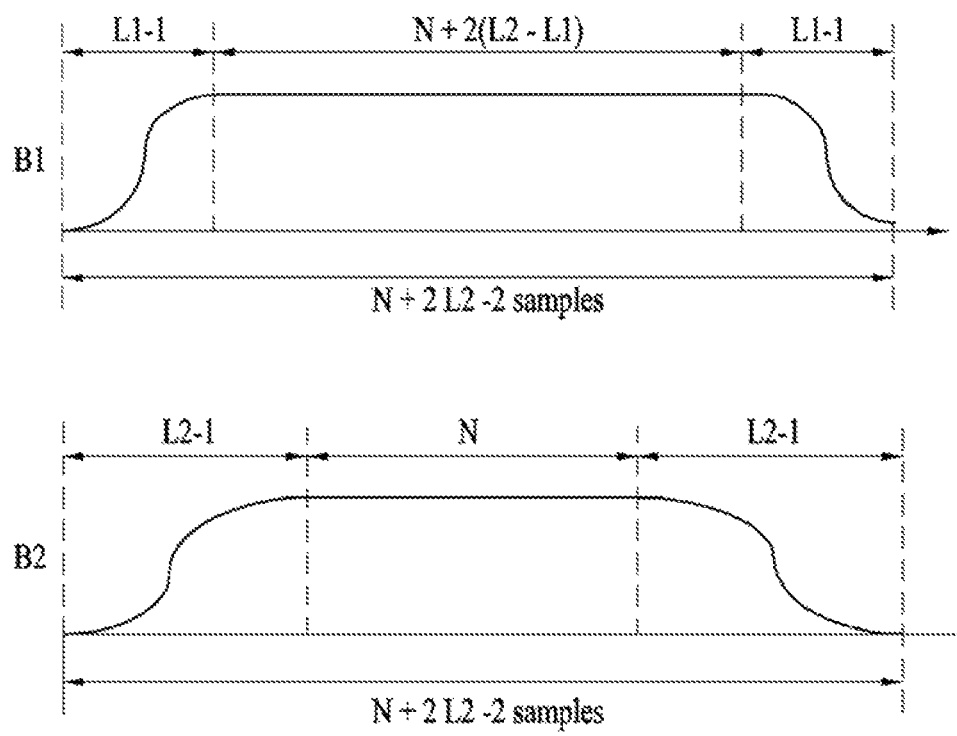
FIG. 8 is an exemplary diagram illustrating adaptive CP length change for a case that filters of different lengths are applied to two subbands (subband B1 and subband B2).

FIG. 8 is an exemplary diagram illustrating adaptive CP length change for a case that filters of different lengths are applied to two subbands B1 and B2.

FIG. 8 corresponds to a case that L2 is greater than L1, and an adaptive CP length W1 of the subband B1 may be calculated from the Equation 1 not the existing L1−1. In accordance with Wi=Li−1+2×(L_max−Li) of the Equation 1, W1=L1−1+2×(L2−L1)=2×L2−L1−1 is obtained. Therefore, if the adaptive CP length of the subband B1 is set to 2×L2−L1−1, there is no interference effect between the two subbands, whereby the transmitting side may transmit a transmission signal to the receiving side by multiplexing the subband B1 and the subband B2 on a frequency domain. In this case, the transmitting side needs to additionally notify the receiving side of information on a filter having the maximum length. Therefore, the transmitting side transmits additional information to the receiving side as follows:

(1) Length and/or coefficient of a filter applied to a transmission signal of the transmitting side at the corresponding band; and (2) Length (L_max) of the greatest filter allocated to the same time interval as that of the transmission signal.

(1) The length and/or coefficient of a filter applied to a transmission signal of the transmitting side at the corresponding band and (2) the length (L_max) of the greatest filter allocated to the same time interval as that of the transmission signal may be included in SIB by the transmitting side during initial access and then transmitted to the receiving side through PDSCH, PBCH, etc. The transmitting side may notify the receiving side of the additional information through a control channel (for example, PDCCH) per K TTI (K is 1 or more).

The receiving side (for example, UE) may exactly obtain a position of a window of N FFT at the corresponding band in a state of a signal transmitted by multiplexing using (1) the length and/or coefficient of a filter applied to a transmission signal of the transmitting side at the corresponding band and (2) the length (L_max) of the greatest filter allocated to the same time interval as that of the transmission signal. That is, a starting point of N FFT window is set based on a symbol of the subband to which the longest filter is applied. In FIG. 7, since L2>L1, N samples from L_max (L2) sample are applied to FFT operation based on the symbols of the subband B2, whereby signal detection may be performed without an interference signal between the subbands even in case of multiplexing. Also, the receiving side (for example, UE) may obtain adaptive CP length at the corresponding band by using (1) the length and/or coefficient of a filter applied to a transmission signal of the transmitting side at the corresponding band and (2) the length (L_max) of the greatest filter allocated to the same time interval as that of the transmission signal, which are signaled, and may transmit the signal to the transmitting side by performing IFFT (Inverse Fast Fourier Transform) operation by using the obtained CP length.

As described above, in the present invention, the low complexity technology for reducing the size of the legacy FFT by using adaptive CP has been suggested, and the method for multiplexing has also been suggested.

Figure 9:
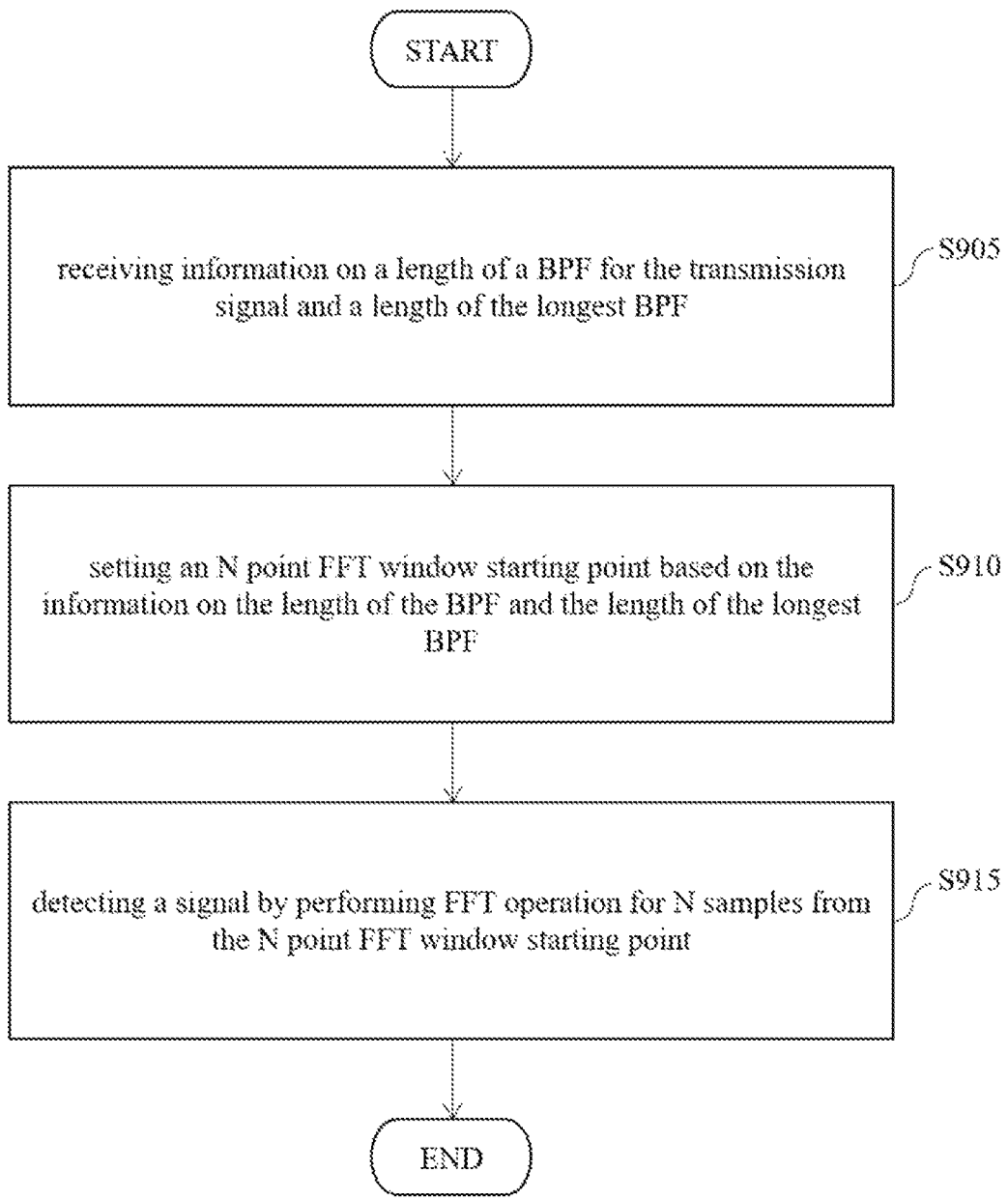
FIG. 9 is a diagram illustrating a method for processing a signal by a receiving side in a wireless communication system according to an embodiment of the present invention.

FIG. 9 is a diagram illustrating a method for processing a signal by a receiving side in a wireless communication system according to an embodiment of the present invention.

Referring to step S905 of FIG. 9, the receiving side may receive, from a transmitting side, information on a length of a band pass filter (BPF) for the transmission signal during a time interval and a length of the longest band pass filter allocated to the time interval. The longest band pass filter may denote a filter having the largest length that can be applied to the transmission signal in the same time interval. The transmission signal may be transmitted from the transmitting side on an assigned band for the receiving side. In step S910 of FIG. 9, the receiving side may set an N point fast Fast-Fourier transform (FFT) window starting point for the assigned band for the receiving side for detecting the transmission signal. The FFT window starting point may be set based on the information on the length of the band pass filter for the transmission signal and the length of the longest band pass filter. N may denote a number of samples of the FFT. In step S915 of FIG. 9, the receiving side may detect a signal by performing FFT operation for N samples from the N point FFT window starting point.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for processing a signal in a wireless communication system and the device therefor industrially applicable to various wireless communication systems.

The invention claimed is:

1. A method for processing a signal by a receiving side device in a wireless communication system, the method comprising:
   receiving, by the receiving side device from a transmitting side, information on a length of a band pass filter to be applied to a transmission signal during a time interval and a length of a longest band pass filter allocated during the time interval, and
   setting, by the receiving side device, an N point fast Fourier transform (FFT) window starting point for an assigned band for the receiving side device to detect the transmission signal based on the information on the length of the band pass filter and the length of the longest band pass filter,
   wherein N is a number of samples of the FFT, and
   wherein the transmission signal is received by the receiving side device on the assigned band.

2. The method of claim 1, further comprising detecting, by the receiving side device, a signal by performing an FFT operation for N samples from the N point FFT window starting point.

3. The method of claim 1, wherein setting the N point FFT window starting point comprises:
   calculating, by the receiving side device, an adaptive cyclic prefix (CP) length (Wi) for the assigned band, and
   setting, by the receiving side device, the N point FFT starting point based on the adaptive CP length,
   wherein:

$$Wi = Li - 1 + 2 \times (L\_max - Li),$$

where i is an index of the assigned band, Li is the length of the band pass filter and L_max is the length of the longest band pass filter.

4. A receiving side device for processing a signal in a wireless communication system, the receiving side device comprising:
   a transmitter;
   a receiver; and,
   at least one processor coupled with the transmitter and the receiver,
   wherein the at least one processor is configured to:
      receive, from a transmitting side, information on a length of a band pass filter to be applied to a transmission signal during a time interval and a length of a longest band pass filter allocated during the time interval, and
      set an N point fast Fourier transform (FFT) window starting point for an assigned band for the receiving side device to detect the transmission signal based on the information on the length of the band pass filter and the length of the longest band pass filter,
   wherein N is a number of samples of the FFT, and
   wherein the transmission signal is received by the receiving side device on the assigned band.

5. The receiving side device of claim 4, wherein the at least one processor is further configured to detect a signal by performing an FFT operation for N samples from the N point FFT window starting point.

6. The receiving side device of claim 4, wherein the at least one processor is further configured to:
   calculate an adaptive cyclic prefix (CP) length (Wi) for the assigned band, and,
   set the N point FFT starting point based on the adaptive CP length,
   wherein:

$$Wi = Li - 1 + 2 \times (L\_max - Li),$$

where i is an index of the assigned band, Li is the length of the band pass filter and L_max is the length of the longest band pass filter.

* * * * *